United States Patent Office 2,847,256
Patented Aug. 12, 1958

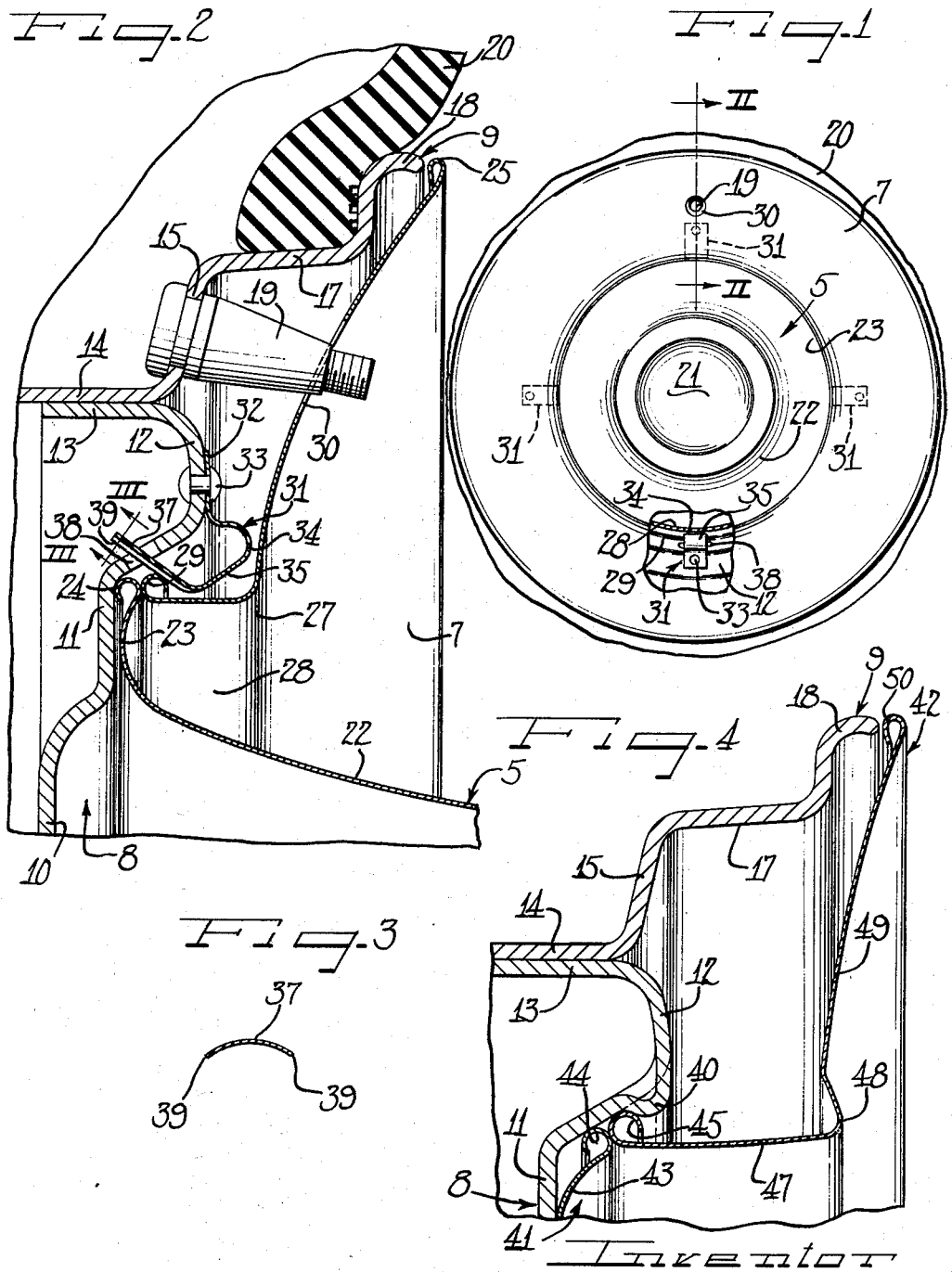

2,847,256

WHEEL COVER

George Albert Lyon, Detroit, Mich.

Application April 26, 1955, Serial No. 504,017

8 Claims. (Cl. 301—37)

The present invention relates to improvements in wheel structures and more particularly concerns the ornamental and protective covering of the outer sides of vehicle wheels.

An important object of the present invention is to provide an improved wheel structure having novel cover assembly for disposition at the outer side thereof.

Another object of the invention is to provide a wheel structure having a cover assembly thereon with novel inter-engagement of circular cover members and retaining means on the wheel.

A further object of the invention is to provide in a wheel structure a cover assembly wherein one circular cover member is engageable with and clamps in place another circular cover member while retaining means on the wheel engages with one of the cover members to hold it in place and thereby retain the assembly on the wheel.

Still another object of the invention is to provide a novel wheel structure wherein a central cover member is locked in place by an outer cover member.

Other objects, features and advantages of the present invention will be readily apparent from the following detailed description of certain preferred embodiments thereof taken in conjunction with the accompanying drawing in which:

Figure 1 is an outer side elevational view of a wheel structure embodying features of the invention;

Figure 2 is a fragmentary enlarged radial sectional view taken substantially on the line II—II of Figure 1;

Figure 3 is a fragmentary sectional detail view of the spring clip taken substantially on line III—III of Figure 2; and Figure 4 is a fragmentary radial sectional view through a modification of the wheel structure and cover assembly.

Having reference first to Figures 1, 2 and 3, a radially inner circular cover member 5 is assembled with a radially outer circular cover member 7 and the cover members are constructed and arranged for disposition over the outer side of a vehicle wheel including a disk spider wheel body 8 and a multi-flange drop center tire rim 9.

Centrally the wheel body 8 has a dished bolt-on flange 10 at the radially outer side of which is an axially outwardly offset annular ledge or axially outwardly facing shoulder 11 that merges with the radially inner side of an axially outwardly extending annular nose bulge 12. At the radially outer side of the annular bulged portion 12 is an axially extending attachment flange 13 which is suitably secured to a base flange 14 of the tire rim 9. From the outer side of the base flange of the tire rim extends a side flange 15 merging with an intermediate flange 17 joining a generally radially outwardly and then axially outwardly turned terminal flange 18. A valve stem 19 is carried by the side flange 15 for inflating a pneumatic tire 20 carried by the tire rim and which may be of the tubeless variety or a tire and tube assembly, as preferred.

A high central crown 21 (Fig. 1) is provided by the central circular cover member 5 for overlying the center of the wheel and more particularly the bolt-on flange 10 and to accommodate axle hub structure of a vehicle axle (not shown) to which the wheel may be attached in service. From the crown slopes an annular generally axially inwardly and radially outwardly extending crown side wall 22 at the inner margin of which is an out-turned flange 23 for overlying the ledge or shoulder 11 of the wheel body. At its extremity the flange 23 is preferably turned generally axially and radially outwardly and has an underturned annular reenforcing and finishing and seating bead 24. This bead is dimensioned to seat within the reentrant corner provided at juncture of the shoulder 11 with the radially inner side wall of the wheel body nose bulge 12, thereby not only supporting the cover member 5 on the wheel but maintaining the same centered thereon.

In order to overlie the tire rim 9 and the nose bulge portion 12 of the wheel body, the circular radially outer cover member 7 is of a width to extend from an outer marginal turned bead reenforcing and finishing extremity 25 generally radially and axially inwardly, herein slightly dished inwardly, to an annular reenforcing rib-like inner marginal portion 27 from which extends axially inwardly an annular spacer and attachment flange 28 the extremity of which is provided with a generally radially and axially outwardly underturned reenforcing and retaining bead 29. By preference the bead 29 is of complementary diameter to the inner cover member bead 24 so as to seat on the bead 24 in concentric assembly of the cover members on the wheel. When thus seated, the cover member 7 is supported in spaced relation to the wheel body and more particularly the nose bulge 12, and preferably also relative to the tire rim 9 including the tip of the terminal flange 18 over which the outer marginal bead 25 of the cover member 7 extends. A suitable aperture 30 in the cover member 7 clears the valve stem 19 for access thereto.

Retention of the cover assembly on the wheel in the present instance is effected by means of a plurality of generally gooseneck spring clips 31 of which there may be four mounted on the nose bulge 12 of the wheel body and engageable in snap-on, pry-off relation with the wheel cover members and more particularly the outer cover member 7. To this end, each of the spring clips 31 has a base portion 32 secured as by means of a rivet 33 to the top of the nose bulge 12 and with a resilient cover-retaining loop portion 34 projecting generally axially outwardly and radially inwardly over the radially inner side of the nose bulge behind the cover member 7 adjacent to the inwardly extending flange 28 thereof. On the bead of the spring clip loop 34 is provided a generally radially and axially inwardly sloping and radially inwardly and axially outwardly facing cam head flange portion 35 from which extends an axially inwardly and radially outwardly oblique cover-retaining terminal or shoulder flange 37. This flange extends through a suitable clearance aperture 38 in the inner side wall of the nose bulge 12, the ends of which aperture serve as stops not only against turning of the clip 31 while the radially inner side defining the aperture avoids undue radially inward flexure of the retaining terminal 37.

In applying the cover assembly to the outer side of the wheel, the inner cover member 5 is first mounted on the wheel by generally centering the same relative to the center of the wheel and then pressing the cover 5 axially inwardly so that the marginal bead 24 of the cover member will cam inwardly on the retaining clip head flanges 35 and thereby resiliently deflect the clips until the bead snaps behind the retaining shoulder flanges 37 of the clips. In this snapped-on relationship, the cover 5 is held loosely on the wheel by the clips since while the diameter of the bead 24 is greater than the inside diameter described about the inner portion of the clip heads 34, there is preferably sufficient clearance afforded to accommodate the retaining bead 29 of the outer cover member.

After the inner cover member 5 has been applied to the wheel, the outer annular cover member 7 is applied to the wheel by first registering the valve stem opening 30 with the valve stem 19 and then pressing the cover member 7 axially inwardly to cam the bead 29 down the sloping clip head shoulders 35 until the bead 29 snaps behind the retaining shoulder flange 37 of the clips and the bead 29 comes to shouldering, clamping rest against the bead 24 of the inner cover member. In this relationship, the retaining clip shoulder flanges 35 shoulder firmly against the bead 29 to maintain it in firm seating clamping engagement against the inner cover member bead 24.

In order to hold the outer annular cover member 7 against turning on the wheel, the retaining clip shoulder flanges 37 are preferably formed to have a biting interengagement with the cover bead 29. To this end, the longitudinal side edges of the clip flange 37 are turned generally axially and radially inwardly to provide biting edges 39. Since the clips are under substantial resilient tension in engagement with the cover and more particularly with the cover bead 29, the biting turn-preventing edges 39 will bite with substantial force into the engaged surface of the bead 29 and thus hold the cover against turning in either rotary direction relative to the wheel.

For removing the cover from the wheel, the outer annular cover member 7 is first pried free from the wheel as by inserting a pry-off tool therebehind and fulcruming the pry-off tool against the tire rim to snap the retaining bead 29 from engagement with the retaining clips 31. Then, the inner cover member 5, which has been, in effect, locked in place by the outer cover member 7, can be removed by applying pry-off tool force behind the marginal bead 24 of the inner cover member and fulcruming the pry-off tool against the nose bulge 12 of the wheel body serving as a pry-off rib for this purpose.

In the modification of Figure 4, an arrangement is shown wherein instead of retaining clips for the cover members, a series of three or four retaining bumps 40 is provided as by pressing the same to project radially inwardly from the radially inner side of the nose bulge 12 adjacent the crown of the nose bulge. In other respects, the wheel, including the wheel body and the tire rim, may be substantially the same as described in connection with Figure 2. For application to the outer side of the wheel provided with the bumps 40, a slightly modified arrangement of circular cooperatively related inner and outer cover members 41 and 42 may be provided. To this end the inner cover member 41 has an outer marginal generally radially and axially outturned flange portion 43 that is preferably arranged to rest against the wheel body ledge or shoulder 11, with an outer marginal turned portion or bead 44 (that may be turned inwardly or outwardly as preferred but is shown as turned inwardly) engageable with the side wall defining the wheel body nose bulge 12 spaced outwardly from the juncture of the inner side wall of the bulge with the shoulder 11 but spaced inwardly from the retaining bumps 40. Thereby, a turned marginal extremity terminal bead 45 at the inner end of an axially extending inner marginal flange 47 of the outer annular cover member 42 is adapted to shoulder with compression thrust against the bead 44 as an incident to engagement of the bead 45 in snap-on relation behind the bumps 40. It will be appreciated, of course, that the dimensioning and relationship of the confronting cover beads 44 and 45 must be such that when the retaining bead 45 is snapped behind the bumps 40, the bead 44 of the inner cover member will maintain radially and axially outward compressive thrust against the bead 45 to hold it under resilient tension against the retaining bumps 40. At the same time, of course, the flange 43 of the inner cover member is held in firmly bottomed relation against the wheel body shoulder 11.

At the axially outer end of the inner marginal flange 47 is a reenforcing annular rib-like juncture 48 with an annular generally radially extending and preferably slightly dished portion 49 of an expanse to substantially overlie the wheel body bulge 12 and the outer side of the tire rim 9. At its outer extremity the cover portion 49 has an underturned reenforcing and finishing bead 50 which is adapted to overlie in spaced relation the tip of the lip of the terminal flange 18 of the tire rim.

In applying the cover of Figure 4 to the outer side of the wheel, the inner cover member 41 is applied over the wheel body in centered relation and then the outer cover member 42 is generally centered with respect to the wheel and more particularly with respect to the retaining bumps 40 and is then pressed axially inwardly so that the retaining bead 45 will snap behind the bumps 40 and enter into retaining, substantially locking relation with the bead 44 of the inner cover member. Removal of the cover is effected by inserting a pry-off tool behind the outer cover member 42 and prying the same free, whereupon the inner cover member will be released for removal from the wheel.

It will be understood that modifications and variations may be effected without departing from the scope of the novel concepts of the present invention.

I claim as my invention:

1. In a wheel structure including a tire rim and a wheel body supporting the tire rim and having cover-retaining means thereon and a shoulder structure spaced generally axially inwardly from the location of the retaining means on the body, a cover assembly for disposition at the outer side of the wheel including a circular inner cover member having radially outer annular terminal structure engageable with said shoulder structure, and a circular outer cover member having radially inner terminal structure separably retainingly engageable with said cover-retaining means and engageable with the terminal structure of the inner cover member for clamping the same against said shoulder structure.

2. In a wheel structure including a tire rim and a wheel body having a dished central portion with an offset annular shoulder thereabout from which extends a generally axially outwardly directed nose bulge, an inner cover member having a marginal structure for seating on said shoulder and retained by the surrounding nose bulge in centered relation with respect to the wheel, a radially outer cover member having an inner marginal structure for seating separably on the marginal structure of the inner cover member and thereby holding the latter in place axially inwardly against said shoulder, and retaining means on the nose bulge for separable retaining engagement with the inner marginal structure of the outer cover member.

3. In a wheel structure including a wheel body having an annular axially outwardly bulged portion, a cover assembly including a radially inner cover member with a marginal portion engageable with the wheel body radially inwardly adjacent said wheel body bulge portion and thereby maintained in centered axially inward disposition relative to the wheel, an outer cover member having an inner margin also engageable radially inwardly of said wheel bulge portion separably against the margin of the inner cover member, and retaining means carried by the bulge portion of the wheel body and separably retainingly engageable with the margin of the outer cover member to thrust the same compressively against the margin of the inner cover member.

4. In a wheel structure including a wheel body having an annular axially outwardly bulged portion, a cover assembly including a radially inner cover member with a marginal portion engageable with the wheel body radially inwardly adjacent said wheel body bulge portion, an outer cover member having an inner margin also engageable radially inwardly of said wheel bulge portion separably against the margin of the inner cover member, and spring-retaining clips carried by the bulge portion of the wheel body and having retaining loop portions resiliently thrustably engageable in press-on, pry-off relation with the margin of the outer cover member to thrust the same compressively against the margin of the inner cover member.

5. In a wheel structure including a wheel body having an annular axially outwardly bulged portion, a cover assembly including a radially inner cover member with a marginal portion engageable with the wheel body radially inwardly adjacent said wheel body bulge portion, an outer cover member having an inner margin also engageable inwardly of said wheel bulge portion against the margin of the inner cover member, and spring-retaining clips carried by the bulge portion of the wheel body and having retaining loop portions resiliently thrustably engageable with the margin of the outer cover member to thrust the same compressively against the margin of the inner cover member, said spring clips having turn-preventing edges thereon angled toward the outer cover member margin for gripping the outer cover member margin and thereby holding the same against turning on the wheel.

6. In a wheel structure including a wheel body having a shoulder portion thereon about which is an annular outwardly projecting portion, a cover assembly for the outer side of the wheel including a central cover member having a turned edge engageable at the juncture of the shoulder with the outwardly extending portion of the wheel body, and an outer annular cover member having an inner turned margin to bear separably against the turned margin of the inner cover member, with retaining means on the outwardly extending portion of the wheel body and retaining said turned margin of the outer cover member in snap-on, pry-off relation thrustingly against the turned margin of the inner cover member.

7. In a wheel structure including a wheel body having an axially outwardly facing shoulder and an annular outwardly projecting portion radially outwardly about said shoulder with retaining bumps on the axially outer portion of said axially outwardly projecting portion, a cover assembly for the outer side of the wheel including an inner cover member having a marginal portion thereof for bottoming on said shoulder and with a turned generally axially and radially outwardly projecting edge for disposition in axially inwardly spaced relation to the retaining bumps, and a radially outer annular cover member having an inner margin with a turned edge engageable in snap-on, pry-off relation with said bumps and thrusting against the turned margin of the inner cover member to lock the same in seating relation against said shoulder.

8. In a wheel structure including a wheel body having a shoulder thereon about which is a generally axially outwardly directed bulge, and with a tire rim supported by the wheel body, a cover assembly for the outer side of the wheel including a circular inner cover member for overlying the wheel body and having a margin for seating separably on said shoulder and having its edge opposed to said bulge for centering the same relative to the wheel, and a radially outer cover member having a generally radially inwardly projecting portion for overlying the tire rim and the bulge portion of the wheel body and a generally axially inwardly directed flange provided with a turned extremity for separable engagement with the marginal portion of the inner cover member and for press-on, pry-off retaining interengagement with cover-retaining means carried by said bulge portion of the wheel body.

References Cited in the file of this patent

UNITED STATES PATENTS

| | | |
|---|---|---|
| 2,484,533 | Sinclair | Oct. 11, 1949 |
| 2,557,124 | Lyon | June 19, 1951 |
| 2,609,245 | Lyon | Sept. 2, 1952 |
| 2,675,271 | Lyon | Apr. 13, 1954 |